Sept. 11, 1934. R. H. GERKE 1,973,059
METHOD AND APPARATUS FOR RELIEVING PLASTIC MATERIALS OF SHRINKAGE STRESSES
Filed Feb. 16, 1932 3 Sheets-Sheet 2
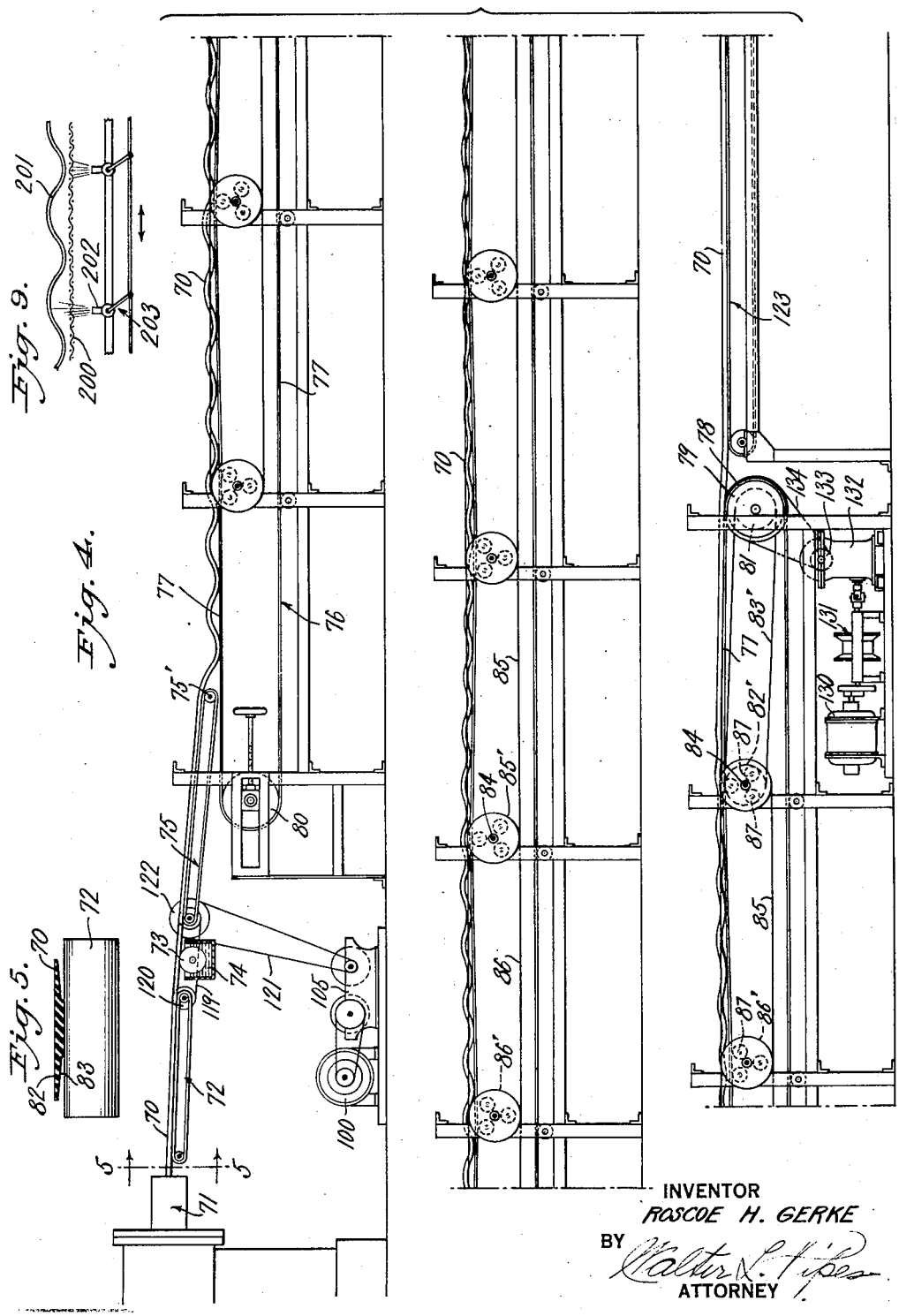
INVENTOR
ROSCOE H. GERKE
BY
ATTORNEY

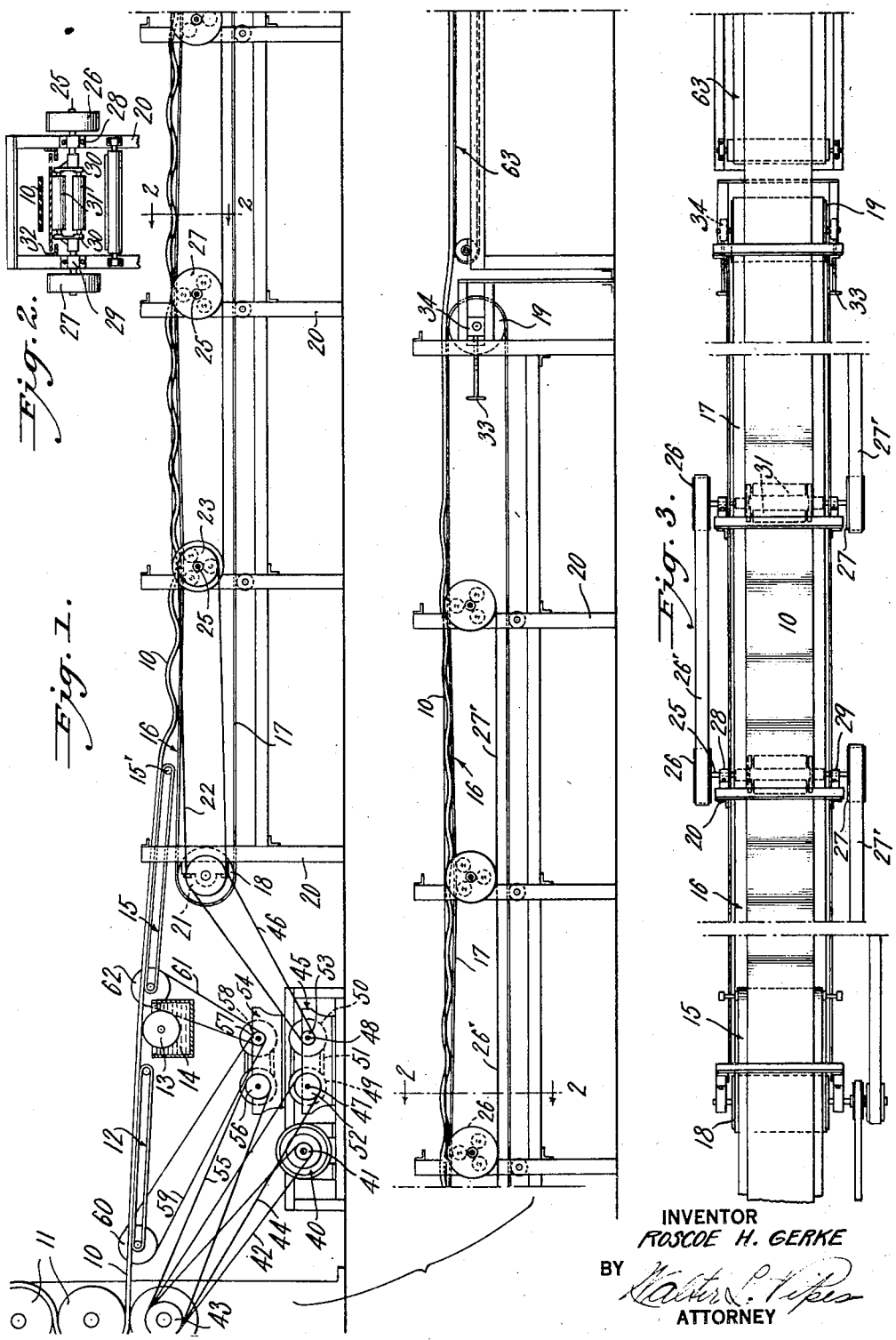

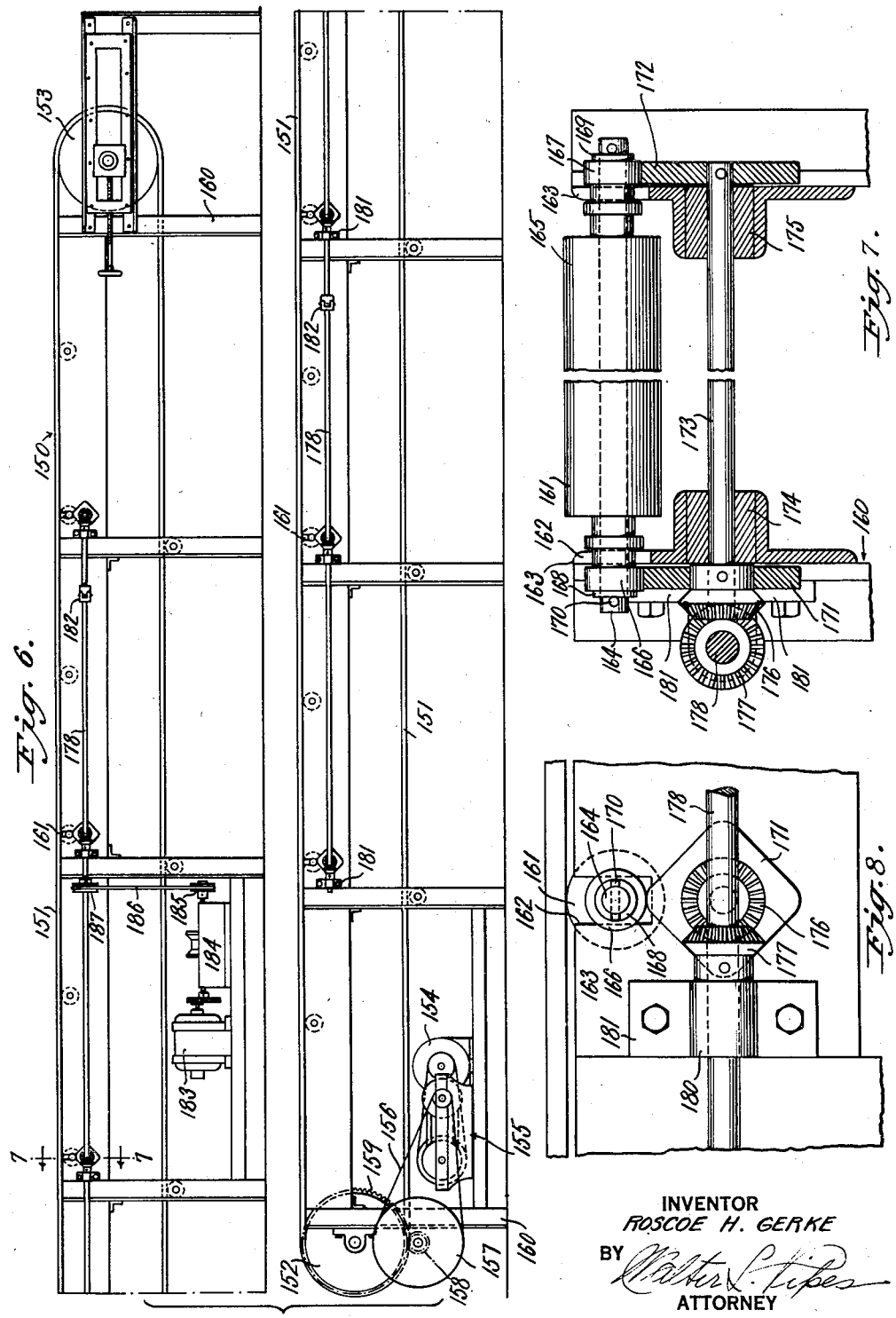

Patented Sept. 11, 1934

1,973,059

UNITED STATES PATENT OFFICE 1,973,059

METHOD AND APPARATUS FOR RELIEVING PLASTIC MATERIALS OF SHRINKAGE STRESSES

Roscoe H. Gerke, Nutley, N. J., assignor to Morgan & Wright, Detroit, Mich., a corporation of Michigan Application February 16, 1932, Serial No. 593,396

17 Claims. (Cl. 18—1)

This invention relates to a method and apparatus for relieving plastic materials, such as rubber of shrinkage stresses.

Heretofore considerable difficulty has been experienced in handling freshly calendered or extruded plastic materials, such as rubber stock for footwear, tire treads, tiles, or other purposes, due to the presence of shrinkage stresses in the materials. While several different methods of overcoming this difficulty have been proposed, none of them has proven satisfactory since they do not remove all of the stresses which cause the shrinkage. As a result, it has been necessary to employ a somewhat thinner, narrower, and longer portion of the plastic stock in initially shaping an article made therefrom, in anticipation of the ensuing changes in dimensions due to shrinkage. In practice, this extra allowance in size which must be provided, is frequently impossible to predict or determine accurately since, unless all of the shrinkage stresses are removed, the shaped article will continue to shrink whenever it is free of restraining forces.

One method that has been proposed for eliminating shrinkage stresses is to cool the freshly calendered or extruded stock and thereby freeze the stresses in the stock. But this method has the obvious disadvantage that, when the stock reaches room temperature or becomes warm again, the stresses again exert themselves and the stock undergoes further shrinkage. Also if there are any scraps remaining after forming or cutting the cold stock into the shape desired, the scraps cannot be thrown directly back into the calender rolls or tubes without first being warmed.

A second method which has been proposed involves compressing or upsetting the stock by feeding it in the form of a flat strip from a relatively fast moving conveyor belt upon a relatively slowly moving belt. This method only partially relieves the stock of its shrinkage stresses since the friction between the contacting surfaces of the stock and the belt prevents removal of all of the stresses.

A third method has been to permit the stock to shrink on hot or dusted tables. This method requires much time and involves considerable handling of the stock.

A fourth method has been to compress the stock both lengthwise and transversely between a pair of relatively moving belts, while still another method has been to feed the stock upon the spaced links of a fabricated metal link belt. The links are then closed together by passing over a cam track, thereby contracting the rubber and partially removing the shrinkage stresses.

A fifth method has been to feed the stock into a succession of suspended reaches at progressively decreasing speeds, a series of rollers providing the conveying means and the supports for the reaches.

The present invention utilizes that property of freshly calendered or extruded plastic material such as rubber stock by which it naturally tends to assume a shape which is free from shrinkage stresses as soon as it leaves the calender rolls or tubing machine. This natural tendency of the stock to relieve itself of shrinkage stresses may be delayed for many hours unless the stock is kept free of such restraining forces as conveyor belts and the like, or book liners. If the stock is kept free of restraining forces, it will undergo substantially complete shrinkage in from one to two minutes. By assisting this natural tendency of the stock to shrink when kept free of restraining forces, this invention provides for substantially complete shrinkage in approximately one minute.

The complete shrinkage of the stock in such a short time is attained in the practice of this invention by providing successive conveying means for the freshly calendered or extruded stock which are operated at speeds progressively slower than the initial speed of stock. Due to the great natural shrinkage occurring between the calender rolls or tubes and the first conveying means, the linear speed of the stock is reduced at this point to as much as 90% of its initial speed. The speed of the conveying belt at this point is therefore carefully regulated so as to maintain it at the same speed as the stock it receives since, if the belt is run faster than the stock, the stock will be stretched, while if it is run slower, the stock will be deposited on the conveyor in waves by the tuber or calender.

The remaining shrinkage stresses are then removed and the stock compacted by depositing it in waves upon a vertically vibrating conveyor belt. The vibrations serve to knock the stock free of the belt at intervals thereby permitting the stock, in its travel along the belt, to shrink naturally and be compacted lengthwise of the belt, with the attendant gradual flattening or diminishing of the size of the waves. The effect of this natural shrinkage or longitudinal shortening of the stock is to relieve the stock of substantially all of the remaining shrinkage stresses. The stock may then be shaped to exact size or length and may be either used immediately or stored indefinitely without danger of further shrinkage. As a result of the complete shrinkage, not only are many economies over old methods effected, but also superior products are obtained. For example, in applying treads to the carcasses of tires formed in the shape of pulley bands, this invention eliminates the frequent trimming of the treads to length because they are too long, or discarding them because they are too short. Moreover, dynamic unbalance of tires is considerably reduced by the production of treads cut to exact length, since the danger of having an excess or a deficiency of material at the meeting edges of the tread strip is eliminated.

For a better understanding of the invention, reference may be had to the accompanying drawings, in which Figure 1 is a composite side elevation of an apparatus for carrying out my invention;

Fig. 2 is a vertical section along the line 2—2 of Fig. 1;

Fig. 3 is a broken plan view of the apparatus shown in Fig. 1;

Fig. 4 is a composite side elevational view of a modified form of apparatus for practicing my invention;

Fig. 5 is a vertical sectional view taken along the line 5—5 of Fig. 4;

Fig. 6 is a side elevational view of a modified form of vibrating apparatus;

Fig. 7 is a fragmentary vertical sectional view along the line 7—7 of Fig. 6;

Fig. 8 is a side elevational view of the details shown in Fig. 7; and Fig. 9 is another form of the invention.

Referring to Figs. 1, 2 and 3, a strip 10 of plastic material, an example of which is rubber stock, issues from the conventional calender rolls 11 on to a take-away conveyor belt 12. From the conveyor 12 the stock 10 passes over roll 13 whose lower half is immersed in a solution of coating material 14, and then to the feeder conveyor belt 15. The roll 13 applies a coating of the cement to the lower side of the stock 10. The stock 10 is then deposited by the belt 15 in the form of waves upon the vibrator conveyor 16 as described more fully hereafter. The delivery end of feeder belt 15 runs over a roller 15' which is preferably positioned closely above conveyor belt 17.

The conveyor 16 comprises a belt 17, a driving roll 18, and a driven roll 19 mounted upon suitable frame work 20. Shafts 25, carrying pulleys 26 and 27, are rotatably mounted in bearings 28 and 29 carried by the frame work 20. Spaced brackets 30 are fixed to each shaft 25 and carry any desired number of strikers, preferably in the form of rollers 31, three equi-spaced rollers being illustrated. The rollers 31, are revolved by the pulleys 26 and 27 and successively strike against the underside of the upper run of the belt 17 due to the distance between the shaft 25 and the plane of the upper run of belt 17 being less than the distance between the shaft 25 and that face of each roller 31 which is furthest removed from the shaft 25. The upper run of belt 17 is thereby intermittently raised forcibly and allowed to fall, whereby the strip is freed from the belt, or at least its frictional contact therewith reduced, so that the strip may shrink substantially without hindrance. The vibrating rollers may be operated independently or as shown in Figs. 1 and 3, wherein several alternately arranged pulleys 26 and 27 are connected by belts 26' and 27' and driven from a suitable source of power. When not being supported nor struck by the rollers 31, the upper run of the belt 17 is supported on brackets 32, illustrated as angle irons mounted on the frame work 20.

The proper degree of tension on the belt 17 is maintained by the adjusting screw and handwheel 33 which moves the slidably mounted bearings 34 of the driven roll 19 in the required direction.

Suitable power mechanism for operating the calender rolls 11 comprises a motor 40, pulley 41, pulley belt 42 and calender pulley 43.

The driving roll 18 of the vibrator conveyor 16 is driven from the calender roll pulley 43 through the pulley belt 44, a conventional variable speed transmission 45, the pulley belt 46 and the pulley 21, which is adapted to be fixed in driving engagement with the roll 18. The variable speed transmission device 45 which is illustrated in Fig. 1 is known as a "Reeves drive". This device comprises spaced shafts 47 and 48 upon each of which are mounted a pair of opposed variably spaced conical pulleys 49 and 50, respectively, connected by a belt 51. By varying the spacing between the conical pulleys of each pair 49 and 50, the relative angular velocities of the shafts 47 and 48 can be readily changed and regulated. The shaft 47 carries a pulley 52, while the shaft 48 carries a pulley 53. The pulley belt 44, driven by the calender roll pulley 43, drives the pulley 52, which through the variable speed transmission 45, drives the pulley 53 at the reduced speed required for vibrator belt 17 of conveyor 16.

The takeaway conveyor 12 and feeder conveyor 15 are driven from the calender roll pulley 43 by a second conventional variable speed transmission 54 similar to the variable speed transmission 45, to prevent relative slippage therebetween. A pulley belt 55, driven by the calender roll pulley 43, drives the pulley 56 which, through the variable speed transmission 54 drives the pulleys 57 and 58 at the reduced speed required by the natural shrinkage of the calendered stock 10. The pulley 57 drives the takeaway belt 12 through the pulley belt 59 and pulley 60, while the pulley 58 drives the feeder belt 15 through the pulley belt 61 and pulley 62. The takeaway belt 12 and feeder belt 15 are preferably driven at the same speed in order to prevent shrinkage occurring during the application of cement to the underside of stock 10 by the roll 13.

Separate variable speed transmissions, such as 45 and 54 have been found suitable, but other forms of drive may be used, if desired. The series of belt-connected pulleys 26 and 27 may be driven from the pulley 21 by means of a belt 22 and a pulley 23 on shaft 25.

At the discharge end of the vibrator conveyor 16, the stock 10 is either stored in a conventional liner roll (not shown) or received by a conveyor 63 for immediate cutting, shaping or other manufacturing operations.

Referring to Figs. 4 and 5, it will be seen that the apparatus for relieving freshly extruded stock of shrinkage stresses is similar to the apparatus used for calendered stock. The extruded tread strip or stock 70 issues from the tubing machine 71 and is received on the takeaway conveyor 72. The strip 70 then passes over roll 73 onto the feeder conveyor 75, and is then deposited in waves upon the vibrator conveyor 76. The roll 73 is not ordinarily used as a coating roll when the stock 70 which is being shrunk is a tread strip. In such case, the coating material 74 is omitted from its container. The delivery end of feeder belt 75 runs over a roller 75' which is positioned above conveyor 76 as shown.

As shown in Fig. 5, the strip 70 may comprise rubber tread stock extruded with its carcass side 82 up, and its wearing surface 83 down. Difficulty has been experienced heretofore in the production of perfect treads, due to the formation of bloom on the carcass side of the tread partly caused by the inoculation thereof with chemical dirt. By keeping the carcass side 82 up, and out of contact with the conveyors 72, 75, and 76, it is kept free and clean of any chemical dirt which might be carried by the conveyors, thereby reducing the number of dry and imperfect treads caused by "bloom".

The power mechanism for operating the takeaway conveyor 72 and feeder conveyor 75 comprises the motor 100, variable speed transmission 105, pulley belt 121, pulley 122, pulley belt 119 and pulley 120.

The construction of the vibrator conveyor 76 may be substantially the same as that described in detail in connection with Figs. 1, 2 and 3. Power for the vibrator conveyor belt 77 may comprise a motor 130, a variable speed transmission 131, speed reducer 132, pulley 133, pulley 78, and pulley belt 134, the belt 77 being supported on a roll 79 fixed to the shaft of the pulley 78. The other end of belt 77 is carried upon an adjustable roll 80. A pulley 81 driven by the shaft of drum 79 is connected to a similar pulley 82' by means of a belt 83' there being provided a series of cross-shafts 84 which may be driven by belts 85 and 86 running on alternately arranged pulleys 85' and 86', so that strikers or rollers 87 may impart motions to the belt 77 as in the Fig. 1 machine. The cross-shafts 84 may be driven in any other satisfactory way.

Upon leaving the vibrator conveyor 76 in a fully shrunk condition, the rubber stock 70 is received by the conveyor 123 and led to suitable cutting and/or weighing apparatus (not shown).

Referring to Figs. 6, 7 and 8, a modified form of vibrating conveyor 150 is shown. In this form, the vibrating conveyor 150 comprises the continuous vibrating belt 151 supported at one end by a driving roll 152, and at the other end by a driven roll 153. The roll 152 may be driven by a motor 154 through a variable speed transmission 155, pulley belt 156, pulley 157, and gears 158 and 159, the gear 159 being fixed to the shaft carrying roll 152. The rolls 152 and 153 and pulley 157 are carried by suitable framework 160.

The upper run of the belt 151 is supported at suitably spaced intervals upon rollers 161 mounted for vertical reciprocating movement in guide notches 162 formed in upper side rails 163 at each side. The rollers 161 comprise a shaft 164, a central roller shell 165 and end rings 166 and 167 which are held in place on the shaft by washers 168 and 169 and drift pins 170. The shell and ring assembly is free to rotate on the shaft 164. The vertical reciprocating movement is imparted to the rollers 161 by spaced pairs of cams 171 and 172 fixed near the ends of a transverse shaft 173 which is mounted adjacent each roller in suitable bearings 174 and 175 at each side of the framework 160. Each transverse shaft 173 carries a bevel gear 176 which meshes with one of a set of bevel gears 177 fixed along the length of a longitudinal shaft 178. The shaft 178 is mounted in bearings 180 carried by brackets 181. Universal joints 182 are provided at suitable intervals along the shaft to care for any changes or errors in its alignment.

The longitudinal shaft 178 is driven by power mechanism comprising a motor 183, a conventional variable speed transmission 184, pulley 185, pulley belt 186, and a pulley 187 fixed to the shaft 178. Upon rotation of the longitudinal shaft 178, a high spot on each of the cams 171 and 172 engages the corresponding ring members 166 and 167, respectively, thereby raising the roller 161. The roller 161 falls back by the action of gravity when a low spot on the cams 171 and 172 is beneath the corresponding rings 166 and 167. The roller 161 is therefore rapidly raised and lowered. This action continuously vibrates the upper run of the belt 151 vertically and causes it to be intermittently raised forcibly and allowed to fall.

*Operation*

The methods of operation and means for carrying out the invention are in general the same for both the calendered and extruded plastic material. In the case of rubber, it has been observed that calendered stock shrinks more than extruded stock. This is believed to be due to the difference in temperature between the calendered and the extruded stock. That is, the rubber stock ordinarily leaves the calendering machines at a temperature of 175° to 200° F. while it leaves the tubing machines at a temperature between 200° and 230° F. This greater temperature of the freshly extruded stock is believed to have an annealing effect which destroys some of the internal shrinkage forces.

Since the shrinkage of the calendered stock 10 is greater than that of the extruded stock 70, it will be obvious that the relative speed of the takeaway and feeder belts 12 and 15, and vibrator belt 17, will have to be slower than for the corresponding belts 72, 75 and 77. It has been found by trial that where the peripheral speed of the calender is 60 ft. per minute, the linear speed of the takeaway belt should be approximately 54 ft. per minute which amounts to a relative speed of 90% of the speed of the stock as it leaves the calender.

This relatively lower speed of the takeaway belt 12 or 72 permits the stock 10 or 70 to be relieved immediately of part of the internal shrinkage stresses. The lower speed also permits the stock to be deposited upon the belt 12 or 72 in a flat condition.

Upon leaving the takeaway belt 12 or 72, the stock 10 or 70 passes over the roll 13, which can be used to apply a coating 14 or 74, to the underside of the stock. From the roll 13 the stock passes to the feeder belt 15 or 75 which is usually run at the same linear speed as the takeaway belt 12 or 72. By the time the stock is deposited upon the vibrating belt 17 or 77, some of the shrinkage stresses have been relieved by annealing. In the case of the calendered stock, the remaining stresses are then relieved through shrinkage by running the vibrator belt 17 at approximately 51 feet per minute which is 85% of the original speed of the stock. It is known that a curve having shrinkage plotted against time falls sharply at first and then gradually flattens out. Also, the rate of relieving the shrinkage stresses decreases with the time at a continuously decreasing rate.

If the speed of the belt 17 or 77 were reduced only enough to compensate for the shrinkage of the stock 10 or 70 at this point of its travel, the stock would contact with the surface of the belt for its entire length, and the friction between the stock and the belt would prevent complete shrinkage. This difficulty has been overcome by a combination of the following two steps: First, the belt 17 or 77 is run much more slowly than is required to exactly compensate for the shrinkage which has occurred up to the time the stock is deposited on said belt, so that the stock 10 or 70 is deposited thereon in the form of waves. Second, the under side of the upper run of the belt 17, 77 or 151 is forcibly struck at suitable intervals by the rollers 31 or 161. These actions respectively form waves in the stock, and throw the stock free of the belt at intervals.

Using the calendered stock 10 again as an example, a satisfactory speed of the belt 17 which will cause the feeder belt 15 to deposit the stock 10 thereon in the form of waves is approximately 45 ft. per minute which is 75% of the speed of the stock 10 as it issued from the calender. By forming the stock 10 or 70 in waves upon the belt 17 or 77, there is a considerable portion of the length of each wave which is out of contact with the belt, and which is therefore free to shrink. Also, the stock is under a slight wave compression due to the weight of the stock in the crests of the waves, which may give rise to a slight additional compacting effect. The formation of waves, and their initial length and depth, depend upon the properties of the material to be shrunk, its cross sectional shape and area, and the relative speeds and spacing of the feeder belt 15 or 75 and the belt 17 or 77. A suitable spacing between the belts is, for example, a distance of one-quarter inch at the point of their nearest approach. A suitable diameter for roller 15' or 75', over which runs the delivery end of the feeder belt, is from 1½ inches to 2 inches, which will permit strips of various thicknesses and stiffnesses to be deposited on the belt 17 or 77 in the form of waves. For depositing a relatively thin strip having little stiffness, such as a calendered shoe stock, the roller should have a diameter not larger than that specified. For depositing a thicker and stiffer strip, such as a tread strip, the roller need not be spaced so closely above the belt 17 or 77, or it may, if desired, have a somewhat larger diameter, for example, from 2 inches to 4 inches. An illustrative range of sizes for the waves which has been found to give satisfactory results, is a length of 6" to 12" from crest to crest, and a depth of ½" to 2" from crest to trough. The foregoing numerical values have been given merely as illustrative of the invention and not as limiting it.

As the stock 10 or 70 shrinks in its travel on the belt 17 or 77, the waves gradually diminish in depth and tend to flatten out. It might be possible to form the waves initially of such a size that the stock would leave the belt in a substantially flat condition without having been subjected to any shaking action, but the shrinkage would not be uniform along the entire length of the stock. To insure the stock leaving the belt in a flat and substantially uniformly and fully shrunk condition, it is found expedient to vibrate or shake the belt 17 or 77 vertically. By the shaking of the belt 17 or 77, the stock 10 or 70 is intermittently thrown free of the belt at intervals. Due to the vibration, the positions of the wave crests shift continually relative to the material of the strip, so that every portion of the strip is repeatedly freed from contact with the conveyor belt 17 or 77. Thus uniform shrinkage of the entire strip is permitted.

It is conceivable that other forms of mechanism may be devised to accomplish the same result without departing from the underlying principle set forth herein,—for instance, various arrangements of intermittent air blasts directed upwards beneath an open mesh conveyor belt, or closely spaced driven rollers for the rubber stock, the blasts being directed between the spaced rollers. One example of such an arrangement is illustrated diagrammatically in Fig. 9 wherein an open mesh conveyor 200 suitably suspended and driven carries the waved rubber stock 201 on its upper surface. A plurality of air nozzles 202 directs blasts intermittently and upwardly through the conveyor 200 to raise and let fall the stock 201, suitable valve mechanism such as indicated at 203 being provided for controlling the blasts, as will be readily understood.

The flattening of the waves obviously follows as a result of the compacting of the stock 10 or 70 whereby the length of the stock is reduced and its transverse cross-sectional area increased. This continuous compacting action helps to eliminate the shrinkage stresses remaining in the stock at the time it was first deposited on the belt 17 or 77.

After the complete removal of shrinkage stresses as above described, the stock may be either stored indefinitely or cut to exact size and shape, without risk of any further shrinkage and its attendant disadvantages.

The above description has been given merely as illustrative of a few practical embodiments of the invention, and, in view of the many modifications which may suggest themselves to those skilled in the art, it is not to be considered as limiting the invention except as may be required by the appended claims.

Having thus described my invention what I claim and desire to protect by Letters Patent is:

1. In the method of shrinking a strip of plastic material, the step of disposing the strip in waves, such that said material in said waves is under wave compression.

2. In the method of shrinking a strip of plastic material, the step of disposing the strip in waves while the material is in longitudinal motion, the material in said waves being under wave compression.

3. In the method of shrinking a strip of plastic material, the step of vibrating the strip vertically while the strip is in continuous longitudinal motion and is free of tension.

4. The method of relieving a strip of plastic material of shrinkage stresses comprising disposing the strip in waves upon supporting means, and repeatedly freeing the strip therefrom or at least reducing its frictional contact thereagainst.

5. The method of eliminating shrinkage stresses from a strip of plastic material comprising depositing the strip in waves upon moving conveying means, and repeatedly freeing the strip from contact with the conveying means.

6. The method of shrinking a strip of plastic material comprising depositing the strip in waves upon flexible conveying means, and repeatedly freeing the strip from contact with said conveying means.

7. The method of increasing the transverse cross sectional area of a strip of plastic material while decreasing its length comprising disposing the strip in waves upon flexible conveying means, and repeatedly raising said conveying means forcibly and allowing it to fall, in a manner such that the strip is intermittently freed from said conveying means.

8. In a machine for shrinking a strip of plastic material, the combination of means for conveying the strip in its travel from a preliminary shaping apparatus, and means for intermittently throwing the strip free from contact with the conveying means during a least part of its travel.

9. In a machine for shrinking a strip of plastic material, the combination of means for conveying the strip in its travel from a preliminary shaping apparatus, and means for vertically vibrating at least part of said conveying means to free the strip therefrom.

10. A machine for shrinking a strip of plastic material, comprising in combination, means for conveying the strip in its travel from a strip-shaping apparatus, and means for rapidly raising and allowing to fall portions of the conveying means, whereby frictional contact between the strip and the conveying means is reduced.

11. A machine for shrinking a strip of plastic material comprising in combination, means for disposing the strip in waves on a longitudinally advancing support, and means for repeatedly freeing the strip from the support and allowing the strip to return thereto by gravity.

12. A machine for shrinking a strip of plastic material, comprising in combination, a conveyor belt for supporting the strip during part of its travel from a strip-shaping apparatus, and means for vertically vibrating at least a part of said belt to free the strip from contact with the belt.

13. A machine for shrinking a strip of plastic material, comprising in combination, a longitudinally extending conveyor belt for supporting the strip after formation in a strip-shaping means, and spaced means for vertically vibrating portions of said belt to free the strip from frictional contact with the belt.

14. A machine for shrinking a strip of plastic material, comprising in combination, a conveyor belt for supporting a strip of said material deposited in waves upon the belt, and means for vibrating said belt comprising a plurality of strikers mounted about an axis adjacent said belt, the distance between said axis and the plane of the belt being less than the distance between said axis and the most remote face of each striker, and means for rotating said strikers about said axis.

15. A machine for shrinking a strip of plastic material, comprising in combination, a longitudinal conveyor belt for supporting the strip during part of its travel from a strip-shaping apparatus, conveyor means for the strip intermediate said strip-shaping apparatus and the conveyor belt, said belt having a linear speed less than that of said conveyor means, whereby the strip is formed into waves on said belt, and means for vibrating said belt vertically to free the strip from contact therewith or at least to reduce its frictional contact thereagainst.

16. A machine for shrinking a strip of plastic material, comprising in combination, a longitudinal conveyor belt for supporting the strip during part of its travel from a strip-shaping apparatus, conveyor means for the strip intermediate said strip-shaping apparatus and the conveyor belt, said belt having a linear speed less than that of said conveyor means, whereby the strip is formed into waves on said belt, and means adapted to intermittently throw the strip free from contact with said belt.

17. A machine for shrinking a strip of plastic material, comprising in combination, a longitudinal conveyor belt for supporting the strip during part of its travel from a strip-shaping apparatus, conveyor means for the strip intermediate said strip-shaping apparatus and the conveyor belt, said belt having a linear speed less than that of said conveyor means, whereby the strip is formed into waves on said belt, and a plurality of strikers beneath said belt cooperating therewith to throw the strip free from contact with the belt.

ROSCOE H. GERKE.